US008825255B2

(12) United States Patent
Boss et al.

(10) Patent No.: US 8,825,255 B2
(45) Date of Patent: Sep. 2, 2014

(54) RECONCILING SERVICE CLASS-BASED ROUTING AFFECTING USER SERVICE WITHIN A CONTROLLABLE TRANSIT SYSTEM

(75) Inventors: Gregory J. Boss, Saginaw, MI (US); Christopher J. Dawson, Alrington, VA (US); Rick A. Hamilton, II, Charlottesville, VA (US); Benjamin G. Morris, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/715,449

(22) Filed: Mar. 2, 2010

(65) Prior Publication Data

US 2011/0218834 A1    Sep. 8, 2011

(51) Int. Cl.
*G01C 22/00* (2006.01)
*G05D 1/00* (2006.01)
*G06Q 10/00* (2012.01)

(52) U.S. Cl.
USPC .......................................... 701/23; 705/7.15

(58) Field of Classification Search
USPC .............................................. 705/7.11–7.42
See application file for complete search history.

(56) References Cited

U.S. PATENT DOCUMENTS

| | | | |
|---|---|---|---|
| 5,177,684 A * | 1/1993 | Harker et al. | 701/117 |
| 5,739,774 A * | 4/1998 | Olandesi | 340/994 |
| 6,262,976 B1 | 7/2001 | McNamara | |
| 6,668,729 B1 | 12/2003 | Richards | |
| 6,810,817 B1 | 11/2004 | James | |
| 6,885,935 B2 | 4/2005 | MacPhail et al. | |
| 7,047,888 B2 | 5/2006 | Richards | |
| 7,698,055 B2 * | 4/2010 | Horvitz et al. | 701/117 |
| 8,150,611 B2 * | 4/2012 | Mukherjee | 701/118 |
| 2004/0054549 A1 * | 3/2004 | Chittenden et al. | 705/1 |
| 2004/0124977 A1 * | 7/2004 | Biffar | 340/539.13 |
| 2005/0004820 A1 * | 1/2005 | LeMieux | 705/5 |
| 2006/0089787 A1 * | 4/2006 | Burr et al. | 701/202 |
| 2006/0259353 A1 * | 11/2006 | Gutmann | 705/13 |
| 2007/0008174 A1 * | 1/2007 | Schwartz | 340/902 |
| 2007/0038362 A1 * | 2/2007 | Gueziec | 701/117 |
| 2008/0027772 A1 * | 1/2008 | Gernega et al. | 705/7 |
| 2008/0033605 A1 * | 2/2008 | Daum et al. | 701/19 |
| 2009/0055271 A1 * | 2/2009 | Drefs et al. | 705/14 |
| 2010/0190510 A1 * | 7/2010 | Maranhas et al. | 455/456.1 |
| 2010/0241501 A1 * | 9/2010 | Marshall | 705/14.13 |

OTHER PUBLICATIONS

Zhao, F. et al., Operational Level-of-Service Index Model for Rail Rapid Transit, Transportation Research Board of the National Academies, Accession No. 00749889 (Abstract). TRIS Files: UMTRIS, pp. 191-201, (1997).

* cited by examiner

*Primary Examiner* — Sujay Koneru
(74) *Attorney, Agent, or Firm* — William E. Schiesser; Keohane & d'Alessandro, PLLC

(57) ABSTRACT

Aspects of this invention provide gradient means for reconciling user service class prioritization. Under this approach, higher priority service classes may be maintained and used to compute routes for reaching desired destinations. However, when such treatment poses a cumulative disadvantage (e.g., an adverse impact that exceeds a predetermined "impact" threshold") to too many users/vehicles, the routing algorithms may be adjusted to minimize overall inconvenience. As such, aspects of this invention provide a means of ensuring that various service classes of system users will not be affected negatively beyond predefined thresholds. Such reconciliation leads to a more flexible system, with higher user satisfaction permissible within the transit system.

16 Claims, 3 Drawing Sheets

RECONCILING SERVICE CLASS-BASED ROUTING AFFECTING USER SERVICE WITHIN A CONTROLLABLE TRANSIT SYSTEM

CROSS-REFERENCE TO RELATED APPLICATION

This application is related in some aspects to commonly-owned and co-pending application Ser. No. 12/715,435, entitled "SERVICE CLASS PRIORITIZATION WITHIN A CONTROLLABLE TRANSIT SYSTEM", the entire contents of which are herein incorporated by reference.

TECHNICAL FIELD

The present invention generally relates to transit systems (e.g., Personal Rapid Transit (PRT) systems). Specifically, the present invention relates to reconciling service class-based routing affecting user service within a controllable transit system.

BACKGROUND

As energy conservation becomes an increasingly important goal, one area of possible improvement is traffic and/or transportation management. Today, a traveler's options are typically limited to either an individual mode of transportation (e.g., an automobile), or mass transit (e.g., airplanes, subways, buses, trains, etc.). Neither option is entirely efficient. As a result, the more recent concept of "Personal Rapid Transit" (PRT) has emerged. PRT is a public transportation concept that offers on-demand, non-stop transportation using small, automated vehicles on a network of specially-built guide-ways. However, several issues stand in the way of efficient management of PRT systems.

SUMMARY

Given that various user service classes may be defined within controllable transit systems, embodiments of this invention provide gradient means for reconciling such user service classes with absolute user numbers. Under these practices, higher priority service classes may be maintained and used to compute routes for reaching desired destinations. However, when such treatment poses a cumulative disadvantage (e.g., an adverse impact that exceeds a predetermined "impact" threshold") to too many users/vehicles, the routing algorithms may be adjusted to minimize overall inconvenience. As such, embodiments of this invention provide a means of ensuring that various services service classes of system users will not be affected negatively beyond pre-defined thresholds. Such reconciliation leads to a more flexible system, with higher user satisfaction permissible within the transit system.

A first aspect of the present invention provides a method for reconciling service class-based routing affecting user service within a controllable transit system, comprising: assigning a service class to each of a plurality of vehicles within the controllable transit system based on sets of attributes of the plurality of vehicles; computing routes for each of the plurality of vehicles to reach a desired destination based on the service class assigned thereto; determining whether the computing of the routes will result in any of the plurality of vehicles having an adverse impact that exceeds a predetermined impact threshold; and re-computing at least one of the routes to reduce the adverse impact below the predetermined impact threshold.

A second aspect of the present invention provides a system for reconciling service class-based routing affecting user service within a controllable transit system, comprising: a memory medium comprising instructions; a bus coupled to the memory medium; and a processor coupled to the bus that when executing the instructions causes the system to: assign a service class to each of a plurality of vehicles within the controllable transit system based on sets of attributes of the plurality of vehicles; compute routes for each of the plurality of vehicles to reach a desired destination based on the service class assigned thereto; determine whether the computing of the routes will result in any of the plurality of vehicles having an adverse impact that exceeds a predetermined impact threshold; and re-compute at least one of the routes to reduce the adverse impact below the predetermined impact threshold.

A third aspect of the present invention provides a computer readable medium containing a program product for reconciling service class-based routing affecting user service within a controllable transit system, the computer readable medium comprising program code for causing a computer to: assign a service class to each of a plurality of vehicles within the controllable transit system based on sets of attributes of the plurality of vehicles; compute routes for each of the plurality of vehicles to reach a desired destination based on the service class assigned thereto; determine whether the computing of the routes will result in any of the plurality of vehicles having an adverse impact that exceeds a predetermined impact threshold; and re-compute at least one of the routes to reduce the adverse impact below the predetermined impact threshold.

A fourth aspect of the present invention provides a method for deploying a system for reconciling service class-based routing affecting user service within a controllable transit system, comprising: providing a computer infrastructure being operable to: assign a service class to each of a plurality of vehicles within the controllable transit system based on sets of attributes of the plurality of vehicles; compute routes for each of the plurality of vehicles to reach a desired destination based on the service class assigned thereto; determine whether the computing of the routes will result in any of the plurality of vehicles having an adverse impact that exceeds a predetermined impact threshold; and re-compute at least one of the routes to reduce the adverse impact below the predetermined impact threshold.

BRIEF DESCRIPTION OF THE DRAWINGS

These and other features of this invention will be more readily understood from the following detailed description of the various aspects of the invention taken in conjunction with the accompanying drawings in which.

Figure 1:
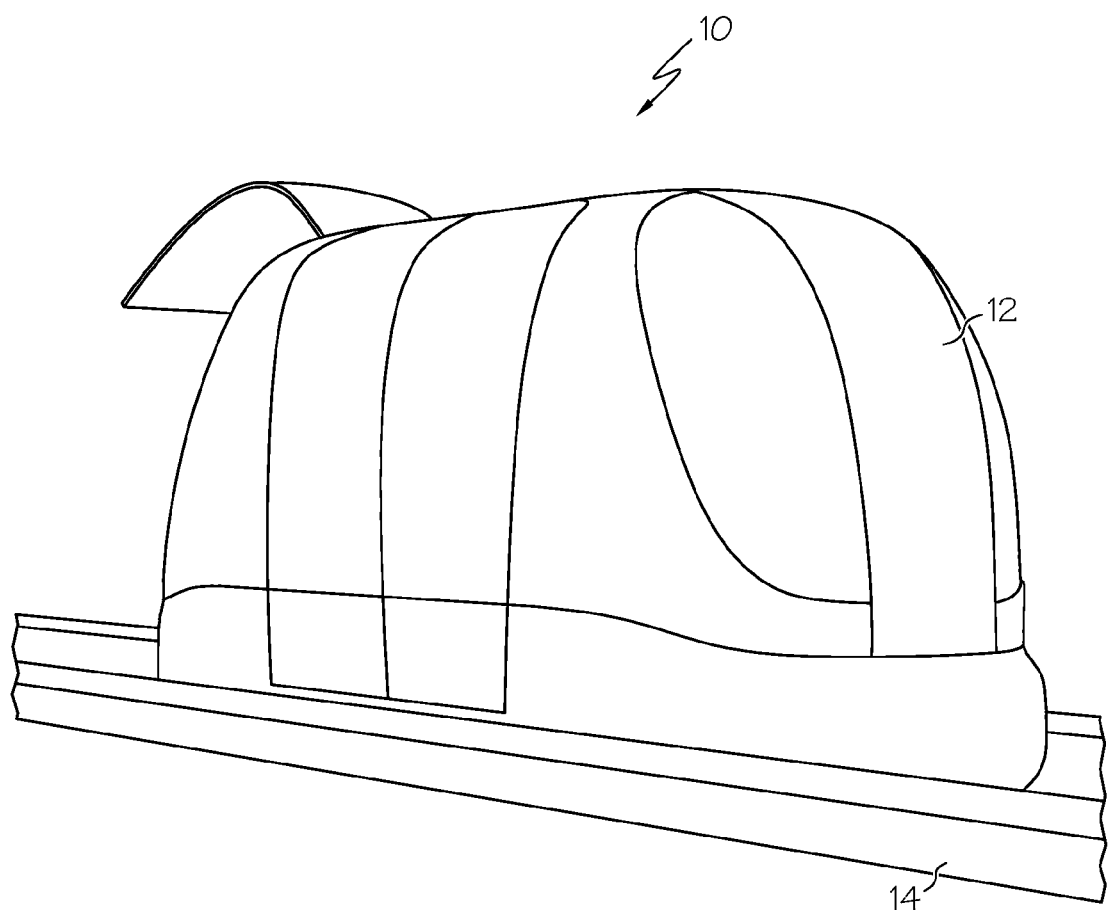
FIG. 1 shows an illustrative vehicle within a controllable transit system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:
I. General Description
II. Computerized Implementation I. General Description Given that various user service classes may be defined within controllable transit systems, embodiments of this invention provide gradient means for reconciling such user service classes with absolute user numbers. Under these practices, higher priority service classes may be maintained and used to compute routes for reaching desired destinations. However, when such treatment poses a cumulative disadvantage (e.g., an adverse impact that exceeds a predetermined "impact" threshold") to too many users/vehicles, the routing algorithms may be adjusted to minimize overall inconvenience. As such, embodiments of this invention provide a means of ensuring that various service classes of system users will not be affected negatively beyond predefined thresholds. Such reconciliation leads to a more flexible system, with higher user satisfaction permissible within the transit system.

An illustrative controllable transit system 10 is depicted in FIG. 1. As shown, system 10 generally comprises a vehicle 12 or the like that is mounted on a rail 14 or the like. Although only one vehicle 12 and one rail 14 are depicted in Fig, 1 for simplicity purposes, it is understood that system 10 can actually comprise any quantity of vehicles and/or rails. Additional rails allow for vehicles to be passed and/or pulled over (e.g., to allow for emergency vehicles to pass by). In any event, system 10 can be thought of as a hybrid between a highly occupied mode of transportation with fixed stops (e.g., subway, bus, etc.), and an individual mode of transportation with destination specific stops (e.g., a taxicab). Along these lines, vehicle 12 can transport one or more users to specific stops along rail 14. It should be understood that although illustrative embodiments of the invention as described herein pertain to a PRT system, this need not be the case. Rather, the teachings recited herein could be implemented in conjunction with any type of controllable transit/transport system now known or later developed.

Figure 2:
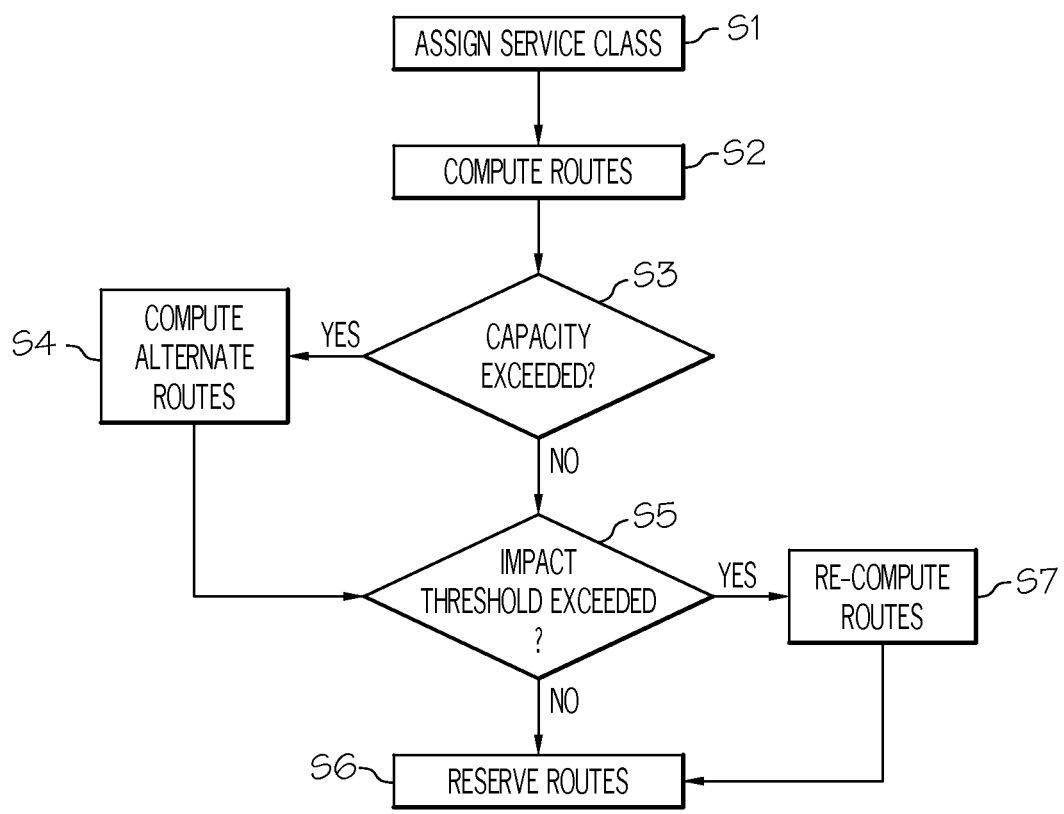
FIG. 2 shows a method flow diagram according to an embodiment of the present invention.

Referring now to FIG. 2, a method flow diagram outlining the steps of at least one embodiment of the present invention is shown. In step S1, a service class is assigned to each of a plurality of vehicles within the controllable transit system based on sets of attributes of the plurality of vehicles. In step S2, routes are computed for each of the plurality of vehicles to reach a desired destination based on the service class assigned thereto. In step S3, it is determined whether a capacity of the route can accommodate the vehicle. If not, an alternate route is determined in step S4. If so, in step S5, it is determined whether the computing of the routes will result in any of the plurality of vehicles (or users therein) having an adverse impact that exceeds a predetermined impact threshold. If not, the routes are reserved as is in step S6. If, however, the predetermined impact threshold would be exceeded for any vehicle and/or user, at least one of the routes will be re-computed in step S7 to reduce the impact below the predetermined impact threshold. Once impact thresholds are properly maintained and capacities are able to accommodate the computed route plan(s), all routes can be reserved in step S8.

It should be understood that although not shown in FIG. 2, an embodiment of the present invention can allow for the upgrading of at least one of the plurality of vehicles to a higher level of service class. This can be based on any type of system desired, such as a trading of service classes and/or routes, financial-based upgrading, frequent user-based upgrading, etc. In any event, routes can be re-computed, re-analyzed for threshold impact compliance and/or capacity compliance, and then reserved as appropriate.

These steps will be further described within the confines of the illustrative examples and/or descriptions set forth below.

EXAMPLE 1

A PRT system may have multiple service classes (e.g., service class A conforming to passenger vehicles, service class B conforming to normal delivery vehicles, and service class C conforming to garbage and waste vehicles). In this case, the passenger vehicles first receive prioritization for optimal routes. Once these routes are created for any interval of time, resultant congestion and road/track usage information is used to optimize routes for delivery vehicles. Once these routes are created for any interval of time, resultant congestion and road/track usage information is used to optimize routes for waste management vehicles.

EXAMPLE 2

A PRT system has a dynamic service classification system wherein a unit containing two tourists is traveling within an area designated as a commercial area which benefits significantly from tourism. Another PRT unit contains one citizen who lives within the PRT area. Currently, both units are within the designated area for tourism. So, in this case, the tourists' PRT unit might be given a Service class 1 designation, whereas the unit containing the local citizen is given a service class B designation. At a future point in time, both units travel beyond the commercial areas designated for tourism and, at that point in time, the system service classifies the citizens' unit as service class A (service class upgrade) and service classifies the tourists' unit as service class B (service class downgrade). The PRT system updates the optimized routing for each vehicle based on the available capacity of the system.

Service Classes

Service classes are defined by a set (e.g., at least one) of attributes that are purposefully flexible in order to accommodate different types of PRT systems. An ideal implementation might include one or more of the following attributes:

Vehicle Type: passenger, delivery, sanitation, emergency
User Type: single commuter, car pool, personal, business
User Role: fire, police, government, doctor, citizen, visitor, tourist, etc.
Vehicle emissions, if applicable: (high, medium, low)
Vehicle Characteristic if applicable: electric, hybrid, gas, diesel While it is recognized that most currently planned PRT systems may be electrified, emissions and drive train characteristics are included here for the sake of completeness and to ensure applicability to the widest possible range of future design points. In any event, in a typical embodiment, service classes are prioritized. This allows the routing service to determine optimal routes first to higher service classes and secondly to lower service classes. Service class priorities would typically be denoted by a numerical or other prioritizing value.

Dynamically Fluctuating Service Classes

Service classes do not need to be static in nature, but may be dynamic and based on various conditions. This allows for a more flexible PRT system that can adjust to business and ambient/environmental conditions. Service classes could, for instance, change priorities based on the following conditions—i.e., when such a condition is met, the service class of a specific PRT unit may be dynamically changed to another service class (either higher or lower).

Fluctuating Service Class Based on Location

Here, a PRT system can define various boundaries within a region that define a desired attribute, and a vehicle can upgrade or downgrade service classes when they enter and exit these geographical boundaries. Embedded or external (e.g., GPS system or similar tracking methods) systems could be employed to determine when a vehicle enters or exits a defined boundary.

Example 1: A municipality that defines an area of the city that benefits greatly from tourism. A service class PRT with a User Role of type "Tourist" would then be upgraded to the highest service class while within those boundaries and downgraded to a lower service class when leaving those boundaries.

Example 2: A commuter might be upgraded to a higher service class while on his/her way to work, but downgraded when deviating from the established route to work.

Fluctuating Service Class Based on Time

Here a PRT system can define various time-bounded properties that are able to trigger an upgrade or downgrade to an existing service class.

Example 3: Delivery vehicles might have certain hours (e.g., 4:00- 6:00 a.m. and 1:00-3:00 p.m.) when they are upgraded to have right-of-way. During other times, they take on a lower service class than other users.

Example 4: Maintenance/work vehicles could be assigned a lower or higher priority service class according to time of day, or day of week.

Example 5: Service class-based incentives could be offered for those reserving their trip in advance and are punctual (e.g., appear at your reservation time and are not late). This could allow for more advanced planning on the part of the overall network management.

Fluctuating Service Class Based on Changed Service Class Attributes or External Factors Any other attribute within the Service class or external factors can be used as a mechanism to trigger a service class change.

Example 6: Service class may be driven by external factors (e.g., seniors get reservation priority on extra hot days).

Example 7: Special events may get 90% of the capacity for short bursts of time, based upon planning for such events.

Example 8: School schedules may result in windows of time where those customers get some level of priority.

Example 9: Lower service class riders may be scheduled so as to increase system efficiency and thus receive a higher service class upon subsequent transport (e.g., people may be commuting from various downtown locations to a park & ride garage. It makes sense to bring them to collection points within a zone, have them disembark from a smaller vehicle, then get into larger, shared vehicles for a streamlined high-priority "shuttle" trip to the garage).

Routing calculations are made to determine optimal routing of users, given the service classes comprised by identified users. Subsequent calculations are then performed to identify the overall delay impact (D) to the "lower" service classes of users. Such delay can be either cumulative within a PRT segment, or it can be per user. If D exceeds a certain threshold, then routing priorities are adjusted to bring the overall delay down to an acceptable level. Note that the higher service class (e.g., Service class A) user will still receive treatment; however, the impact of this priority is mitigated so as to not inconvenience too many lower service class (e.g., Service class B) users.

Without such a method in place a lower service class user could constantly be pre-empted by higher service class users to the point that the user would never be able to use the PRT system. This method provides the ability to ensure that all service classes of users will receive adequate levels of service. In addition to delay (D) we also describe emissions (E), and cost (C) as factors to consider in the reconciliation methods. These methods apply to both demand-based routing systems (e.g., what is my current best option anticipating that I need to leave now) as well as reservation-based routing and/or start time delayed-based routing.

EXAMPLE 1

Within a purely service class-based system, circumstances may dictate delay for multiple users. In a simple example, user Rick may be "service class A," whereas user Chris may be "service class B." Such delays for user Chris are to be expected under the nature of service classes as previously described. However, if the number of "service class B" users inconvenienced by treatment to the service class A user, or if the total impact of applying priority algorithms is above a certain threshold, then the treatment is reduced in scope or omitted for a period of time such that enough lower service class users can be serviced.

EXAMPLE 2

Service class A user has his route, and several service class B users have their routes. If the current service class B user requests a route now it will push the value D over its limit. So, instead of rerouting a service class A person, the service class B person is offered an option to delay their start time by X minutes, and, by so doing, they will be given an upgrade to a Service class A route, and/or will be notified that they will save X minutes/cost/emissions.

Reconciliation Methods

These methods describe the unique ways in which the PRT reconciles routing delays of lower service class users. Each method is unique and allows the system to prevent a situation that introduces mass inefficiencies for the collective system. Where delay impact (D) is described below the value, emissions (E) or cost (C) can be substituted.

Collective Delay of All Lower Service Classes

This method allows any number N of a higher service class to obtain optimized routes until a threshold D is reached collectively of all lower service classes. With this method, all higher service class users may get optimized if the aggregate resulting delay D of all the lower service classes does not exceed a threshold T.

Disparate Offset Between Service Classes—N to M

This method prevents a change from affecting the delay D as a function of the ratio of how many higher service class users there are to lower service class users. Effectively, this prevents one or more higher service class users from negatively affecting a collection of lower service class users by inducing an offset limitation. If the offset is 30%, then this prevents N higher service class users from creating more than a 30% deficit in delay D. The deficit is calculated by measuring collectively the time saved for the higher service class users and subtracting that from the collective total time D from the lower service class users.

Cumulative Delay of Higher Service Class User Over Time

This method prevents a single higher service class or user within a service class from affecting a delay impact D beyond a predetermined threshold within a specified time window. The threshold may, for example, specify that a user may not create more than a 20% delay impact over an 8 hour window. This means he may during a 2 hour commute create a 80% deficit [0.2*(8/2)=0.8] so long as no other delay deficit is incurred in the remaining 6 hours.

Real-time Feedback of Lower Service Class Users

This method employs a mechanism to receive feedback from all users of the PRT system. Feedback may be gathered at anytime during the PRT transit, but is probably most often gathered at the end of the trip or towards the last part of the trip. As higher service class users are getting optimized routes and thus causing delay impacts "D," the system will monitor the user satisfaction of the lower service class users and prevent further delays or route optimization of higher service class users when user satisfaction drops below a predetermined threshold.

Financial Based Impact

This method seeks to balance delay impact with financial factors. Here, users can influence how much delay impact they either inflict or suffer based on how much they are willing to augment their PRT transit financially. Essentially, N number of higher service class users can opt to pay more to achieve a more optimized route. That additional cost can be used as revenue or as a way to offset the delay impact of the lower service class users. This could result in a PRT transit discount to the lower service class users because of a slightly higher than normal delay.

Time Offset Upgrades

This methods seeks to balance routing optimization over time by offering incentives to lower service class users. The incentive to the lower service class user is an upgrade in the route to a higher service class route if they will agree to a delayed start time. The system will make this kind of offer if it sees reduced traffic load at a future time, and such delays will cause greater overall system efficiency. The lower service class user is then upgraded to a higher service class (less transit time) if they are flexible enough to delay their start time.

II. Computerized Implementation

Figure 3:
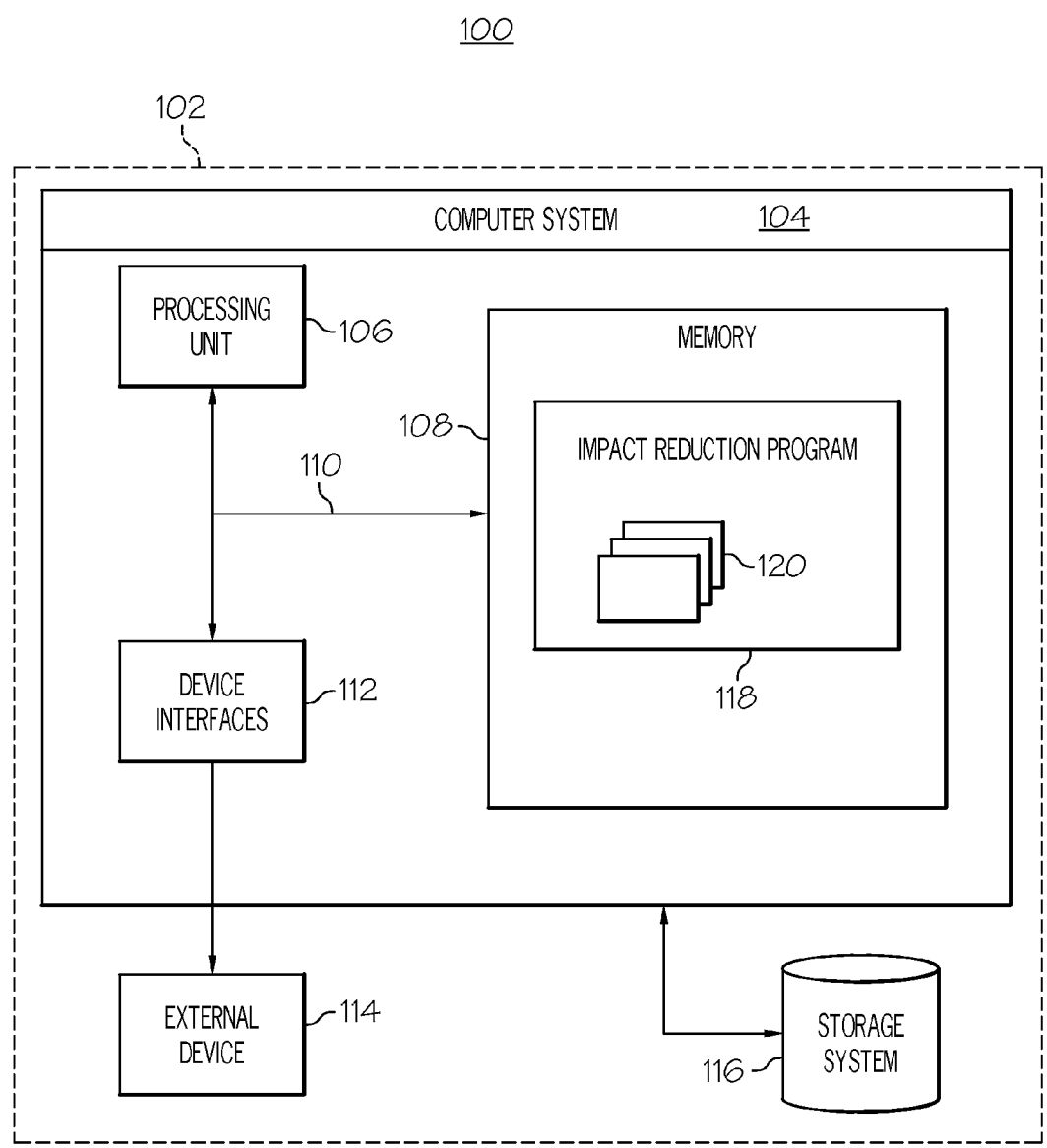
FIG. 3 shows a more specific computerized implementation according to an embodiment of the present invention.

Referring now to FIG. 3, a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and a device interfaces 112. Further, computer system 104 is shown having external devices 114 and storage system 116 that communicate with bus 110 via device interfaces 112. In general, processing unit 106 executes computer program code, such as impact reduction software/program 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as: a keyboard, a pointing device, a display, etc.; one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN), or a storage area network (SAN) (not shown). In addition, although not shown, additional components, such as cache memory, communication systems, system software, etc., may be incorporated into computer system 104.

Shown in memory 108 of computer system 104 is impact reduction program 118, with a set of modules 120. The modules 120 generally provide the functions of the present invention as described herein. Specifically (among other things), set of modules 120 is configured to: assign a service class to each of a plurality of vehicles within the controllable transit system based on sets of attributes of the plurality of vehicles; compute routes for each of the plurality of vehicles to reach a desired destination based on the service class assigned thereto; determine whether the computing of the routes will result in any of the plurality of vehicles having an adverse impact that exceeds a predetermined impact threshold; recompute at least one of the routes to reduce the impact below the predetermined impact threshold; upgrade at least one of the plurality of vehicles to a higher level of service class; and/or re-compute the route for the at least one of the plurality of vehicles based on the higher level of service class.

While shown and described herein as an impact reduction solution, it is understood that the invention further provides various alternative embodiments. For example, in one embodiment, the invention provides a computer-readable/useable medium that includes computer program code to enable a computer infrastructure to provide an impact reduction solution. To this extent, the computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide an impact reduction solution. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising.

In still another embodiment, the invention provides a computer-implemented method for impact reduction within a controllable transit system such as a PRT. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 3), from a computer-readable medium; adding one or more computing devices to the computer infrastructure; and incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for reconciling service class-based routing affecting user service within a controllable transit system, comprising:

assigning, by at least one processor, a service class to each of a plurality of vehicles within the controllable transit system based on at least one of an emissions and a fuel type of each of the plurality of vehicles, the service class having an associated priority therewith, each of the plurality of vehicles being a small automatically controlled form of ground-based public transportation operating on a network of specially-built guideways that provides on-demand, non-stop transportation to an individual occupant;

computing, by the at least one processor, routes for each of the plurality of vehicles to reach a desired destination specified by the individual occupant based on the priority level of the service class assigned thereto;

responsive to receipt of at least one of a financial commitment and selection of a delayed start time associated with at least one of the plurality of vehicles, upgrading the at least one of the plurality of vehicles to a service class of a higher level priority;

recomputing, by the at least one processor in response to the upgrading, updated routes for each of the plurality of vehicles to reach the desired destination based on the priority level, as upgraded, of the service class assigned thereto;

making, by the at least one processor, a prediction as to whether the recomputing of the routes resulting from the upgrading of the at least one of the plurality of vehicles will result in vehicles assigned to a lower priority service class having a collective adverse impact that exceeds a predetermined impact threshold;

making, by the at least one processor, a prediction as to whether the recomputing of the routes resulting from the upgrading of the at least one of the plurality of vehicles will result in any other vehicle of the plurality of vehicles having an adverse impact that exceeds a predetermined impact threshold; and responsive to a prediction of either a collective adverse impact or a single-vehicle adverse impact, re-computing, by the at least one processor, at least one of the routes to reduce the adverse impact below the predetermined impact threshold.

2. The method of claim 1, the predetermined impact threshold pertaining to a particular time delay of at least one of the plurality of vehicles.

3. The method of claim 1, the predetermined impact threshold pertaining to a disparate delay between at least two of the plurality of vehicles.

4. The method of claim 1, the predetermined impact threshold pertaining to a cumulative delay of at least one of the plurality of vehicles over a predetermined time window.

5. The method of claim 1, the predetermined impact threshold pertaining to a financial impact caused by a delay of at least one of the plurality of vehicles.

6. A system for reconciling service class-based routing affecting user service within a controllable transit system, comprising:
   a memory medium comprising instructions;
   a bus coupled to the memory medium; and
   a processor coupled to the bus that when executing the instructions causes the system to:
      assign a service class to each of a plurality of vehicles within the controllable transit system based on a number of passengers within each of the plurality of vehicles, the service class having an associated priority therewith, each of the plurality of vehicles being a small automatically controlled form of ground-based public transportation operating on a network of specially-built guideways that provides on-demand, non-stop transportation to an occupant;
      computing routes for each of the plurality of vehicles to reach a desired destination specified by the individual occupant based on the priority level of the service class assigned thereto;
      responsive to receipt of at least one of a financial commitment and selection of a delayed start time associated with at least one of the plurality of vehicles, upgrade the at least one of the plurality of vehicles to a service class of a higher level priority;
      recompute, in response to the upgrading, updated routes for each of the plurality of vehicles to reach the desired destination based on the priority level, as upgraded, of the service class assigned thereto;
      making a prediction as to whether the recomputing of the routes resulting from the upgrading of the at least one of the plurality of vehicles will result in vehicles assigned to a lower priority service class having a collective adverse impact that exceeds a predetermined impact threshold;
      making a prediction as to whether the recomputing of the routes resulting from the upgrading of the at least one of the plurality of vehicles will result in any other vehicle of the plurality of vehicles having an adverse impact that exceeds a predetermined impact threshold; and
      responsive to a prediction of either a collective adverse impact or a single-vehicle adverse impact, re-compute at least one of the routes to reduce the adverse impact below the predetermined impact threshold.

7. The system of claim 6, the predetermined impact threshold pertaining to a particular time delay of at least one of the plurality of vehicles.

8. The system of claim 6, the predetermined impact threshold pertaining to a disparate delay between at least two of the plurality of vehicles.

9. The system of claim 6, the predetermined impact threshold pertaining to a cumulative delay of at least one of the plurality of vehicles over a predetermined time window.

10. The system of claim 6, the predetermined impact threshold pertaining to a financial impact caused by a delay of at least one of the plurality of vehicles.

11. A computer readable device containing a program product for reconciling service class-based routing affecting user service within a controllable transit system, the computer readable device comprising program code for causing a computer to:
   assign a service class to each of a plurality of vehicles within the controllable transit system based on a travel purpose of a passenger carried by each of the plurality of vehicles, the service class having an associated priority therewith, each of the plurality of vehicles being a small automatically controlled form of ground-based public transportation operating on a network of specially-built guideways that provides on-demand, non-stop transportation to an occupant;
   computing routes for each of the plurality of vehicles to reach a desired destination specified by the individual occupant based on the priority level of the service class assigned thereto;
   responsive to receipt of at least one of a financial commitment and selection of a delayed start time associated with at least one of the plurality of vehicles, upgrade the at least one of the plurality of vehicles to a service class of a higher level priority;
   recompute, in response to the upgrading, updated routes for each of the plurality of vehicles to reach the desired destination based on the priority level, as upgraded, of the service class assigned thereto;
   making a prediction as to whether the recomputing of the routes resulting from the upgrading of the at least one of the plurality of vehicles will result in vehicles assigned to a lower priority service class having a collective adverse impact that exceeds a predetermined impact threshold;
   making a prediction as to whether the recomputing of the routes resulting from the upgrading of the at least one of the plurality of vehicles will result in any other vehicle of the plurality of vehicles having an adverse impact that exceeds a predetermined impact threshold; and
   responsive to a prediction of either a collective adverse impact or a single-vehicle adverse impact, re-compute at least one of the routes to reduce the adverse impact below the predetermined impact threshold.

12. The computer readable device containing the program product of claim 11, the predetermined impact threshold pertaining to a particular time delay of at least one of the plurality of vehicles.

13. The computer readable device containing the program product of claim 11, the predetermined impact threshold pertaining to a disparate delay between at least two of the plurality of vehicles.

14. The computer readable device containing the program product of claim 11, the predetermined impact threshold pertaining to a cumulative delay of at least one of the plurality of vehicles over a predetermined time window.

15. The computer readable device containing the program product of claim 11, the predetermined impact threshold pertaining to a financial impact caused by a delay of at least one of the plurality of vehicles.

16. A method for deploying a system for reconciling service class-based routing affecting user service within a controllable transit system, comprising:

providing a computer infrastructure being operable to:
  assign, via the computer infrastructure, a service class to each of a plurality of vehicles within the controllable transit system based on a vehicle type of the plurality of vehicles, the service class having an associated priority therewith, each of the plurality of vehicles being a small automatically controlled form of ground-based public transportation operating on a network of specially-built guideways that provides on-demand, non-stop transportation to an occupant, wherein the vehicle type comprises at least one of passenger, delivery, sanitation, and emergency;
  compute, via the computer infrastructure, routes for each of the plurality of vehicles to reach a desired destination specified by the individual occupant based on the priority level of the service class assigned thereto;
  responsive to receipt of at least one of a financial commitment and selection of a delayed start time associated with at least one of the plurality of vehicles, upgrade the at least one of the plurality of vehicles to a service class of a higher level priority;
  recompute, via the computer infrastructure in response to the upgrading, updated routes for each of the plurality of vehicles to reach the desired destination based on the priority level, as upgraded, of the service class assigned thereto;
  making, via the computer infrastructure, a prediction as to whether the recomputing of the routes resulting from the upgrading of the at least one of the plurality of vehicles will result in vehicles assigned to a lower priority service class having a collective adverse impact that exceeds a predetermined impact threshold;
  making, via the computer infrastructure, a prediction as to whether the recomputing of the routes resulting from the upgrading of the at least one of the plurality of vehicles will result in any other vehicle of the plurality of vehicles having an adverse impact that exceeds a predetermined impact threshold; and
  responsive to a prediction of either a collective adverse impact or a single-vehicle adverse impact, re-compute, via the computer infrastructure, at least one of the routes to reduce the adverse impact below the predetermined impact threshold.

* * * * *